United States Patent
Fortna et al.

(10) Patent No.: US 11,025,723 B2
(45) Date of Patent: Jun. 1, 2021

(54) SYSTEMS AND METHODS FOR MOUNTS FOR RECORDING DEVICES

(71) Applicant: Axon Enterprise, Inc., Scottsdale, AZ (US)

(72) Inventors: Raymond T. Fortna, Seattle, WA (US); Tyler J. Conant, Seattle, WA (US); James N. Reitz, Bainbridge Island, WA (US); Anthony G. Huang, Seattle, WA (US); Joseph C. Dimino, Jr., Seattle, WA (US); Michelle J. Guarino, Seattle, WA (US)

(73) Assignee: Axon Enterprise, Inc., Scottsdale, AZ (US)

(*) Notice: Subject to any disclaimer, the term of this patent is extended or adjusted under 35 U.S.C. 154(b) by 145 days.

(21) Appl. No.: 15/602,420

(22) Filed: May 23, 2017

(65) Prior Publication Data

US 2017/0346904 A1    Nov. 30, 2017

Related U.S. Application Data

(60) Provisional application No. 62/342,809, filed on May 27, 2016.

(51) Int. Cl.
    *H04L 29/08*      (2006.01)
    *H04L 12/40*      (2006.01)
    (Continued)

(52) U.S. Cl.
    CPC ........ *H04L 67/125* (2013.01); *G08B 13/1963* (2013.01); *G08B 13/19652* (2013.01);
    (Continued)

(58) Field of Classification Search
    CPC ............. H04L 67/125; H04L 12/40097; H04L 12/40117; H04L 12/40136; H04L 41/0806;
    (Continued)

(56) References Cited

U.S. PATENT DOCUMENTS

| | | |
|---|---|---|
| 8,396,943 B2 | 3/2013 | Okaya |
| 8,978,967 B2 | 3/2015 | Gamboa |

(Continued)

FOREIGN PATENT DOCUMENTS

| | | |
|---|---|---|
| FR | 2980750 A1 | 4/2013 |
| JP | 2009118132 A | 5/2009 |

(Continued)

OTHER PUBLICATIONS

International Searching Authority, Written Opinion and the International Search Report for International Application No. PCT/US2017/034684 dated Aug. 22, 2017.

(Continued)

*Primary Examiner* — Techane Gergiso

(57) ABSTRACT

Systems and methods for configuring the operation of recording devices that may be removably mounted to a mount. A mount may provide a unique identifier. The unique identifier may be used to select a configuration profile for configuring the operation of the recording device coupled to the mount. A recording device that is moved from one mount to another may receive a different profile in accordance with the identifier of the new mount to control the operation of the recording device while mounted to the new mount. A server may store, retrieve, and provide profiles to recording devices.

19 Claims, 8 Drawing Sheets

(51) Int. Cl.
  *H04L 12/24* (2006.01)
  *G08B 13/196* (2006.01)
(52) U.S. Cl.
  CPC .. *H04L 12/40097* (2013.01); *H04L 12/40117* (2013.01); *H04L 12/40136* (2013.01); *H04L 41/0806* (2013.01); *H04L 2012/40273* (2013.01)
(58) Field of Classification Search
  CPC ...... H04L 2012/40273; G08B 13/1963; G08B 13/19652; H04W 12/02; H04W 12/08
  See application file for complete search history.

(56) References Cited

U.S. PATENT DOCUMENTS

| | | | | |
|---|---|---|---|---|
| 8,994,822 | B2* | 3/2015 | Smitherman | G01C 11/025 |
| | | | | 348/144 |
| 9,030,557 | B2 | 5/2015 | Wende | |
| 9,187,060 | B1* | 11/2015 | Crider | B60R 25/102 |
| 9,193,359 | B2* | 11/2015 | Hui | B60R 16/02 |
| 9,842,496 | B1* | 12/2017 | Hayward | B60K 35/00 |
| 10,239,491 | B1* | 3/2019 | Crider | B60R 25/31 |
| 10,565,680 | B2* | 2/2020 | Stepanenko | G06T 5/006 |
| 2004/0143378 | A1 | 7/2004 | Vogelsang | |
| 2007/0197194 | A1 | 8/2007 | Oyagi et al. | |
| 2008/0294690 | A1 | 11/2008 | McClellan et al. | |
| 2013/0006775 | A1* | 1/2013 | Jordan | G08G 1/20 |
| | | | | 705/14.62 |
| 2013/0063596 | A1* | 3/2013 | Ueda | B60K 37/06 |
| | | | | 348/148 |
| 2014/0267745 | A1* | 9/2014 | Martin | G08B 13/1968 |
| | | | | 348/159 |
| 2014/0309842 | A1 | 10/2014 | Jefferies et al. | |
| 2014/0310739 | A1* | 10/2014 | Ricci | G06F 3/04886 |
| | | | | 725/28 |
| 2014/0335794 | A1 | 11/2014 | Forouzan | |
| 2015/0135172 | A1 | 5/2015 | Hooft | |
| 2015/0149682 | A1* | 5/2015 | Uemura | G06F 13/28 |
| | | | | 710/308 |
| 2015/0191119 | A1 | 7/2015 | Hikita | |
| 2015/0249578 | A1 | 9/2015 | Bothe | |
| 2015/0254968 | A1 | 9/2015 | Sanders | |
| 2015/0296371 | A1 | 10/2015 | Kong | |
| 2015/0301113 | A1* | 10/2015 | Sims | H04Q 9/00 |
| | | | | 324/426 |
| 2015/0370253 | A1 | 12/2015 | Gurin | |
| 2016/0295089 | A1* | 10/2016 | Farahani | H04N 5/23216 |
| 2016/0325680 | A1* | 11/2016 | Curtis | B60R 1/00 |
| 2016/0360088 | A1* | 12/2016 | Tanabiki | H04N 5/77 |
| 2017/0248434 | A1* | 8/2017 | Best | G08G 1/096716 |
| 2017/0285642 | A1* | 10/2017 | Rander | B60N 2/0244 |
| 2017/0316696 | A1* | 11/2017 | Bartel | G08G 1/202 |
| 2017/0346904 | A1 | 11/2017 | Fortna et al. | |
| 2018/0040256 | A1* | 2/2018 | Alvarez | G09B 9/05 |
| 2018/0244124 | A1* | 8/2018 | Hill | B60G 17/016 |
| 2018/0251067 | A1* | 9/2018 | Elliott | B60R 1/00 |
| 2019/0118712 | A1* | 4/2019 | Shigemura | B60R 1/00 |
| 2019/0144021 | A1* | 5/2019 | Yoshimoto | B61L 27/0077 |
| | | | | 701/29.6 |

FOREIGN PATENT DOCUMENTS

| | | |
|---|---|---|
| WO | 2006085703 A1 | 8/2006 |
| WO | 2009023614 A1 | 2/2009 |
| WO | 2015156921 A1 | 10/2015 |
| WO | 2017205744 A1 | 12/2018 |

OTHER PUBLICATIONS

Australian Patent Office, Full Examination Report for Australian Patent Application No. 2017270565 dated Jan. 21, 2019.
Canadian Patent Office, Canadian Office Action for Canadian Patent Application No. 3,025,319 dated Jan. 2019.
European Patent Office, Extended European Search Report for European Patent Application No. 17803661.2 dated Nov. 5, 2019.

* cited by examiner

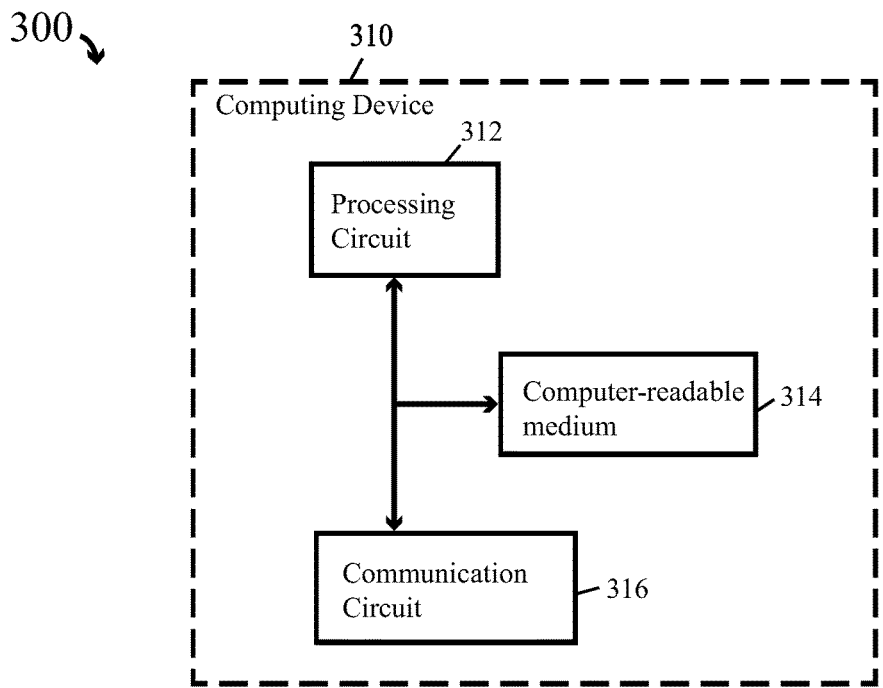

224

Recording Device Type 500

| Mount position | Vehicle type | Vehicle ID | Profile |
|---|---|---|---|
| Back seat | Patrol | X | Profile 502 |
| Front cabin view | Patrol | X | Profile 504 |
| Front windshield view | Patrol | X | Profile 506 |
| Trunk | Patrol | X | Profile 508 |
| ⋮ | ⋮ | ⋮ | ⋮ |
| Rear view | Transport | X | Profile 510 |
| Back seat | Transport | X | Profile 512 |
| Front cabin view | Transport | X | Profile 514 |
| ⋮ | ⋮ | ⋮ | ⋮ |
| Front cabin view | X | 956A10D3 | Specific Profile 520 |
| ⋮ | ⋮ | ⋮ | ⋮ |
| Back seat | X | X | Default Profile 530 |
| Front windshield view | X | X | Default Profile 532 |
| ⋮ | ⋮ | ⋮ | ⋮ |

Recording Device Type 540

| Mount position | Vehicle type | Vehicle ID | Profile |
|---|---|---|---|
| Back seat | Patrol | X | Profile 542 |
| Front cabin view | Patrol | X | Profile 544 |
| Front windshield view | Patrol | X | Profile 546 |
| ⋮ | ⋮ | ⋮ | ⋮ |

Recording Device Type 580

| Mount position | Vehicle type | Vehicle ID | Profile |
|---|---|---|---|
| Back seat | Patrol | X | Profile 582 |
| Front cabin view | Patrol | X | Profile 584 |
| Front windshield view | Patrol | X | Profile 586 |
| ⋮ | ⋮ | ⋮ | ⋮ |

FIG. 5

SYSTEMS AND METHODS FOR MOUNTS FOR RECORDING DEVICES

FIELD OF INVENTION

Embodiments of the present invention relate to recording devices.

BRIEF DESCRIPTION OF THE SEVERAL VIEWS OF THE DRAWING

Embodiments of the present invention will be described with reference to the drawing, wherein like designations denote like elements, and:

FIG. 3 is a block diagram of an embodiment of a processing device;

FIG. 4 is a diagram of data stored in an embodiment of a data store for mount identifiers;

FIG. 5 is a diagram of data stored in an embodiment of a profile data store;

Figure 1:
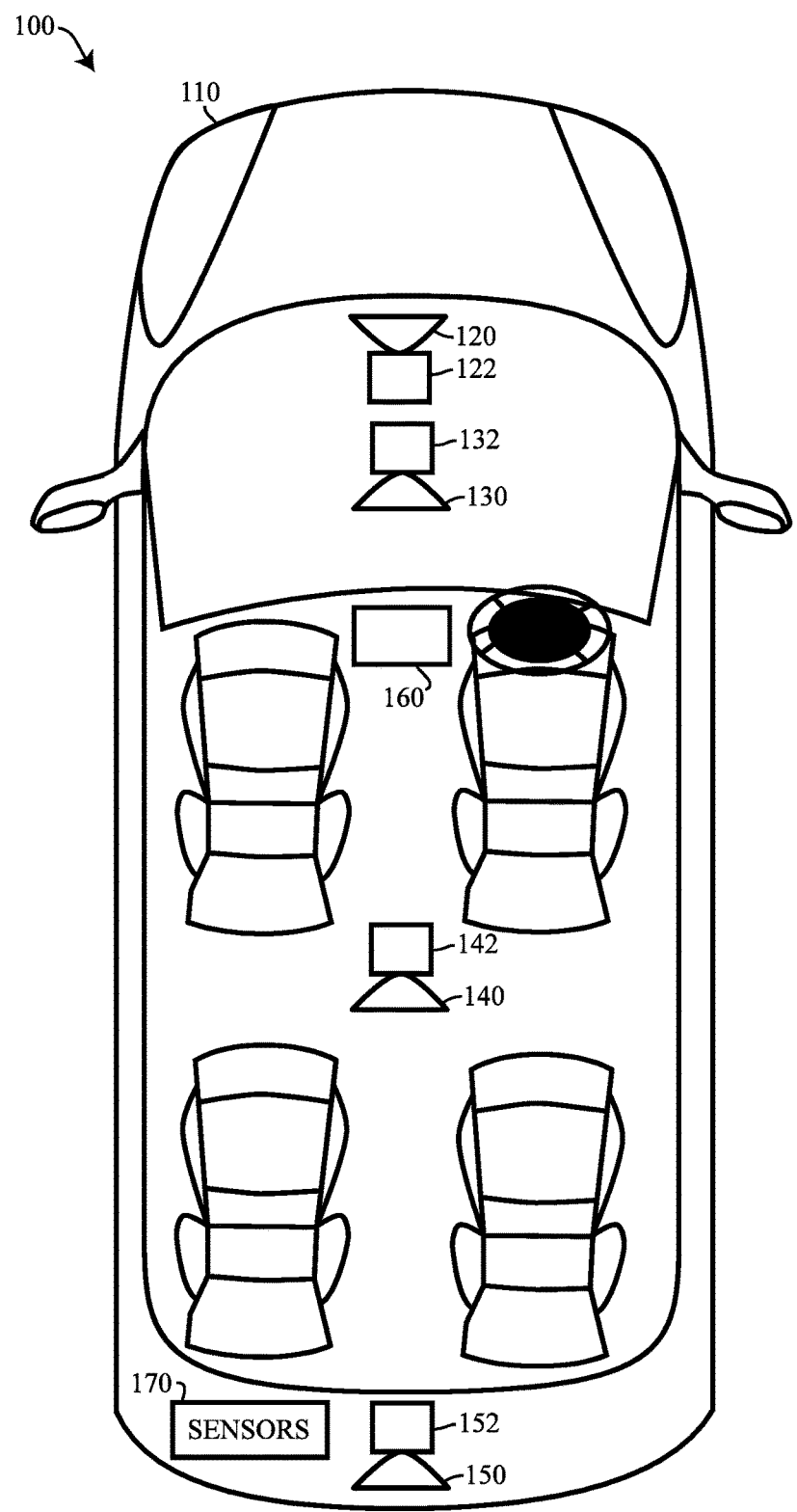
FIG. 1 is a plan view of recording devices and mounts therefor in a vehicle.
Figure 2:
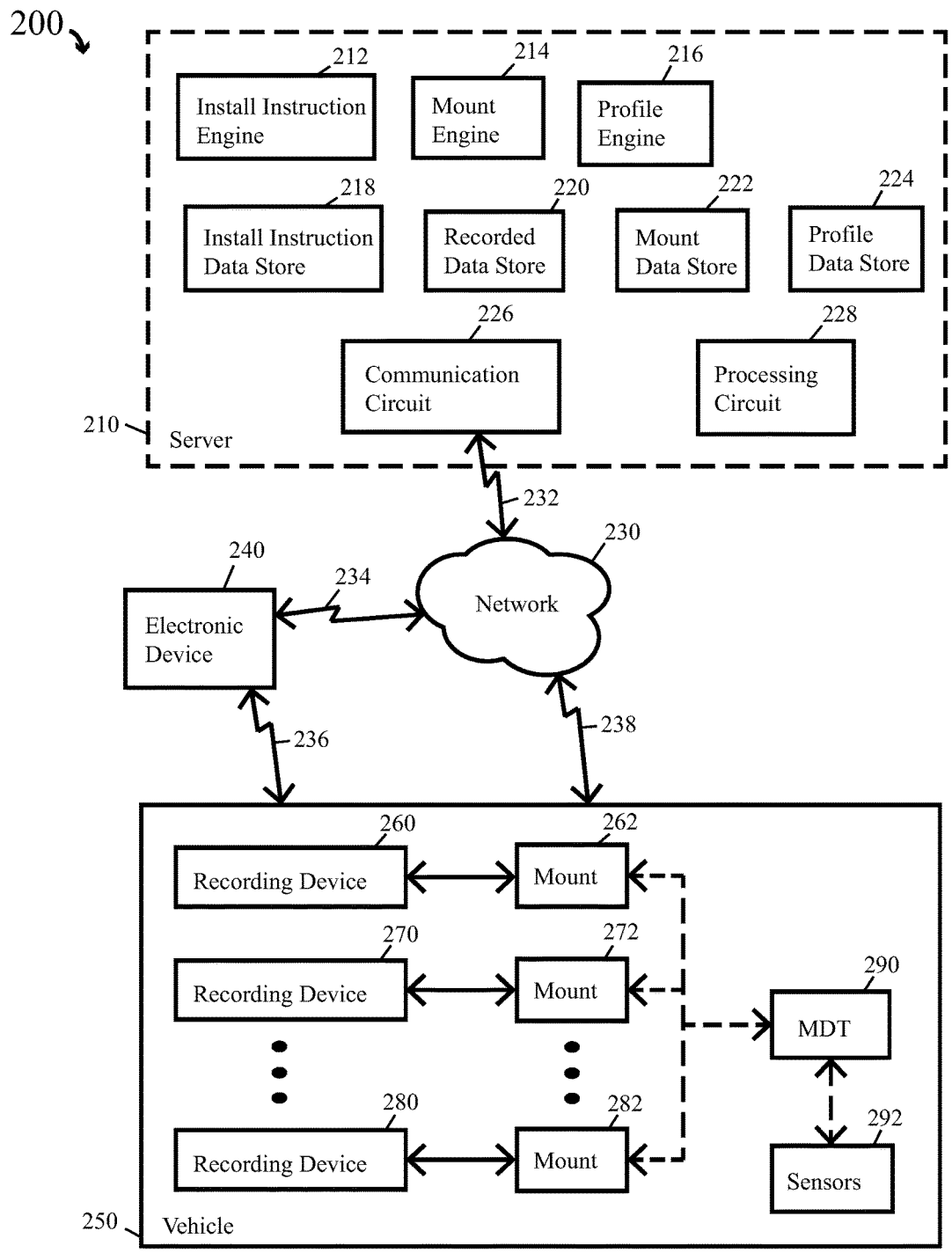
FIG. 2 is a block diagram of a system for relating recording devices to mounts.
Figure 6:
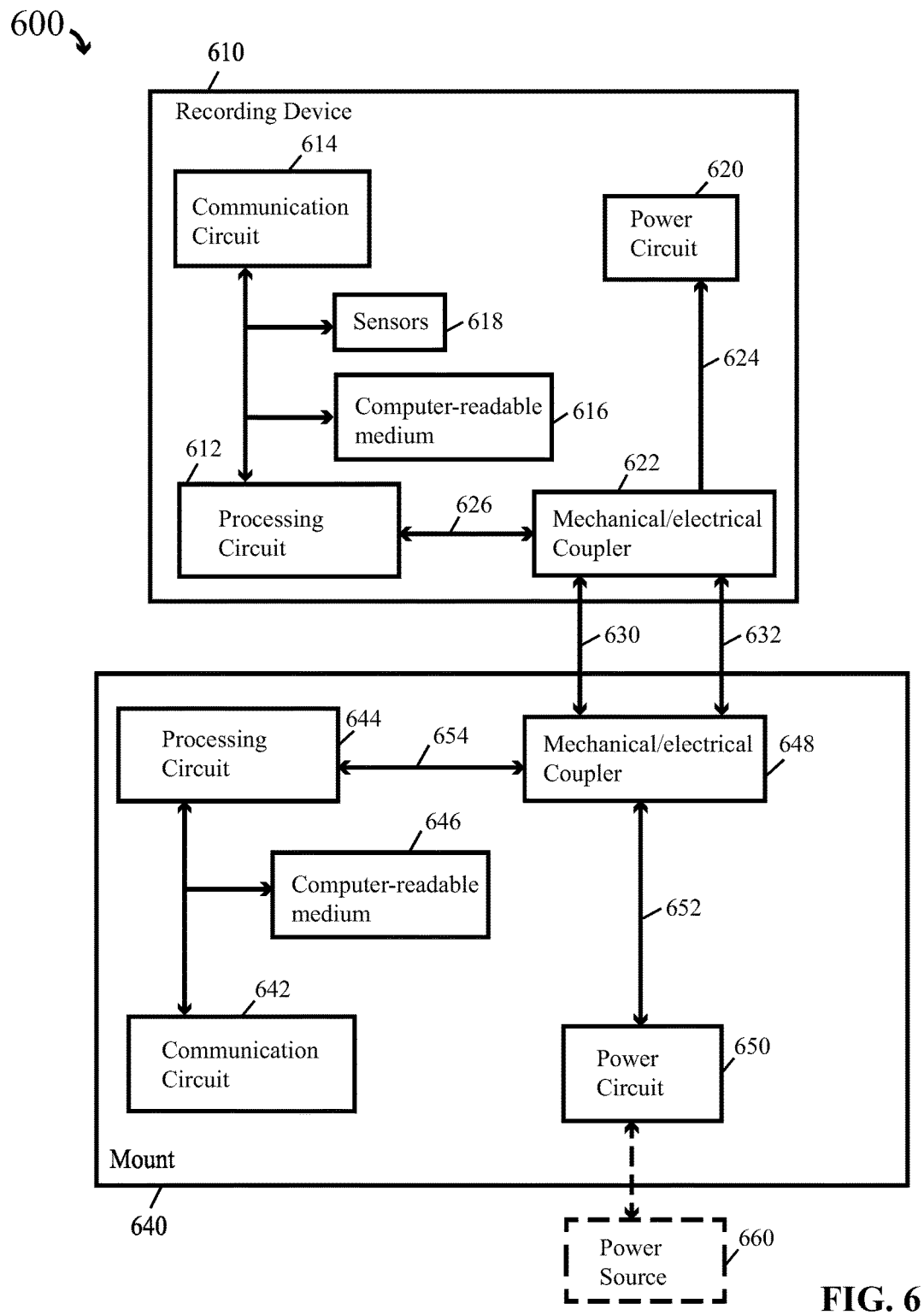
FIG. 6 is a block diagram of a recording device coupled to a mount.
Figure 7:
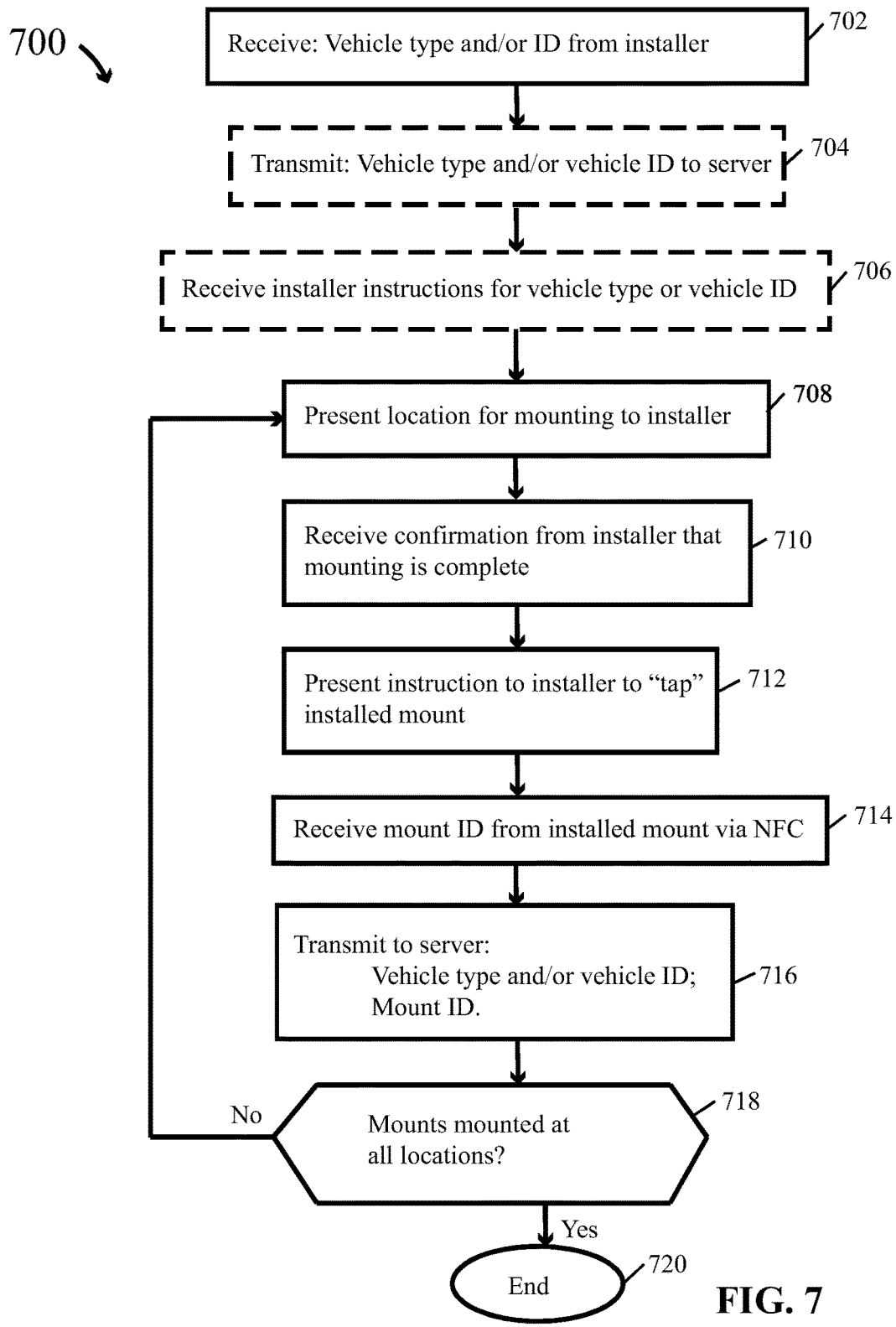
FIG. 7 is a method for installing mounts in a vehicle.
Figure 8:
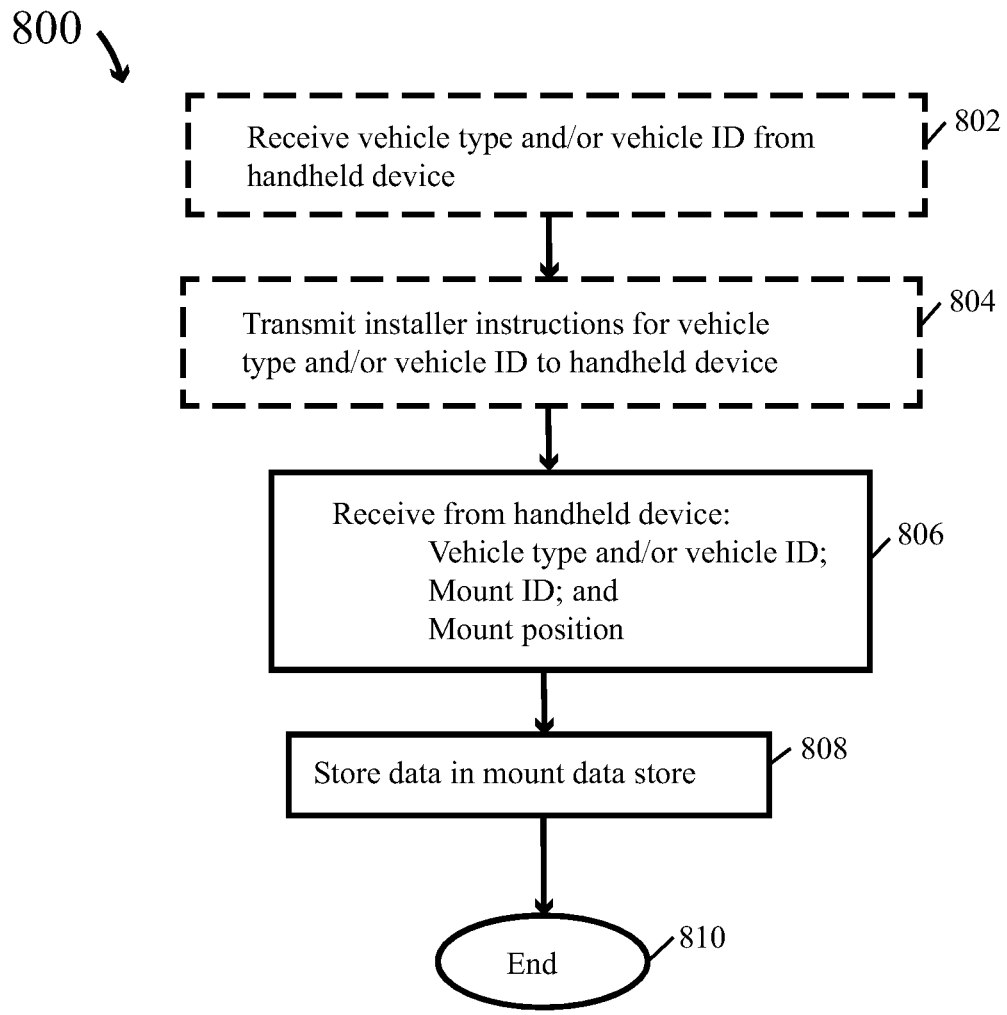
FIG. 8 is a method for storing data related to one or more mounts on a server.
Figure 9:
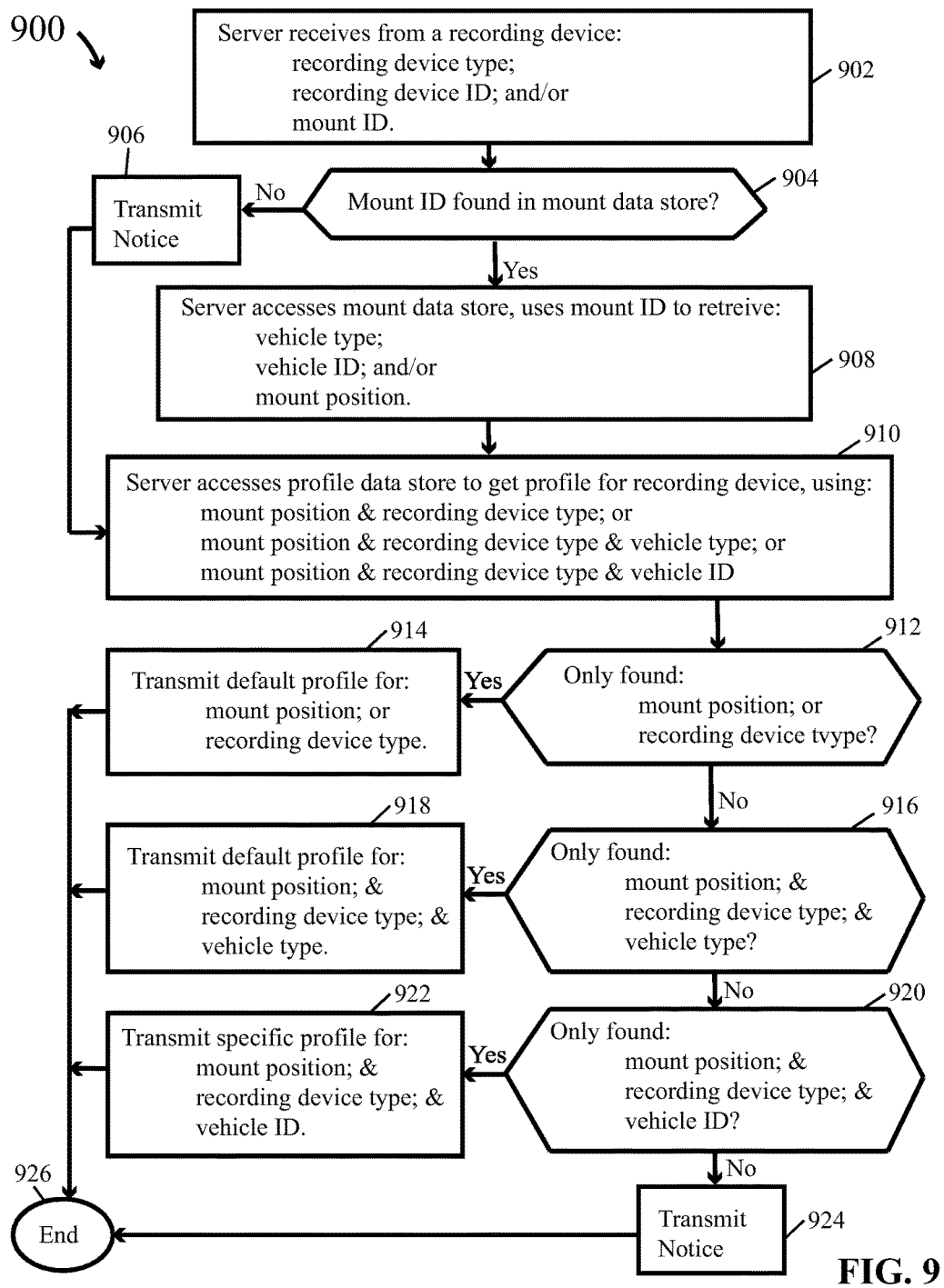
FIG. 9 is a method for retrieving a configuration profile for a recording device.

The numerical designators in the drawing indicate the following: 100: vehicle system, 110: vehicle, 120: recording device, 122: mount, 130: recording device, 132: mount, 140: recording device, 142: mount, 150: recording device, 152: mount, 160: mobile data terminal ("MDT"), 170: sensors, 200: configuration system, 210: server, 212: install instruction engine, 214: mount engine, 216: profile engine, 218: install instruction data store, 220: recorded data store, 222: mount data store, 224: profile data store, 226: communication circuit, 228: processing circuit, 230: network, 232: communication link, 234: communication link, 236: communication link, 238: communication link, 240: electronic device, 250: vehicle, 260: recording device, 262: mount, 270: recording device, 272: mount, 280: recording device, 282: mount, 290: mobile data terminal ("MDT"), 292: sensors, 300: engine implementation, 310: engine, 312: processing circuit, 314: computer-readable medium, 316: communication circuit, 410: mount record, 412: mount id, 414: mount position, 416: vehicle type, 418: vehicle id, 420: mount record, 422: mount id, 424: mount position, 426: vehicle type, 428: vehicle id, 430: mount record, 432: mount id, 434: mount position, 436: vehicle type, 438: vehicle id, 500: recording device type, 502: profile, 504: profile, 506: profile, 508: profile, 510: profile, 512: profile, 514: profile, 520: specific profile, 530: default profile, 532: default profile, 540: recording device type, 542: profile, 544: profile, 546: profile, 580: recording device type, 582: profile, 584: profile, 586: profile, 600: recording device and mount system, 610: recording device, 612: processing circuit, 614: communication circuit, 616: computer-readable medium, 618: sensors, 620: power circuit, 622: mechanical/electrical coupler, 624: connection, 626: connection, 630: communication link, 632: connection, 640: mount, 642: communication circuit, 644: processing circuit, 646: computer-readable medium, 648: mechanical/electrical coupler, 650: power circuit, 652: connection, 654: connection, 660: power source, 700: method for installing a mount, 702: identifier, 704: transmit, 706: receive, 708: prompt, 710: confirm, 712: tap, 714: receive, 716: transmit, 718: verify, 720: end, 800: method for installing a mount, 802: identifier, 804: instructions, 806: receive, 808: store, 810: end, 900: method for retrieving a profile, 902: receive, 904: check, 906: notice, 908: access, 910: access, 912: search, 914: transmit, 916: search, 918: transmit, 920: search, 922: transmit, 924: notice, and 926: end.

DETAILED DESCRIPTION OF INVENTION

Police officers may use one or more different vehicles in the course of their duties. Vehicle types may include prisoner transport, cruisers, squad transport, and unmarked vehicles. Officers may be issued recording devices such as cameras and microphones. Recording devices may be hand-held, body-mounted, or mounted in or on a vehicle. Recording devices mounted in a vehicle may be removed for recording away from the vehicle then returned to the mount in the vehicle. Recording devices that operate in a vehicle may cooperate with mounts to form a vehicle system.

A recording device mounted in or on a vehicle may be required to perform different functions according to the type of vehicle the recording device is mounted in and/or the location in the vehicle where the recording device is mounted. For example, a camera mounted in a prisoner transport vehicle may always illuminate the recording indicator on the recording device and may record video, in the case of a camera, in high definition format. In contrast, an unmarked vehicle may not illuminate the recording indicator and may record high definition video only if the recording device is directed toward the back seat of the vehicle where a prisoner may be placed.

The various types of recording device may include a camera that records in the visible light spectrum, a camera that records in the infrared light spectrum, an electronic compass, a microphone and/or a GPS receiver. The operation of a recording device may be in accordance to the type of vehicle and the position where the recording device is mounted in the vehicle. The operation of a recording device may be determined by setting (e.g., writing) configuration bits (e.g., data) to the recording device. Configuration settings may set (e.g., control, select, enable) recording device operations such as video quality, frames per second, f-stop setting, calibration, format for reporting information, range of signals detected or captured, mode (e.g., protocol) for communication, power mode, or other function related to a recording device.

The operation of a recording device may also be in accordance with the position of the mount that holds (e.g., secures) the recording device such that the same recording devices performs certain functions when mounted to a mount positioned at a first position yet performs different functions when mounted to a mount positioned at a second position. For example, a camera mounted in a front-facing position may operate to record video data at a higher resolution than the resolution of a camera mounted in a rear-facing position.

Mounts may be installed into vehicles at one or more locations. Mounts may remain in their installed location regardless of whether a recording device is coupled to the mount. A recording device may be removably coupled (e.g. attached) to a mount. While attached to a particular mount, a recording device may perform a particular set of functions. The same recording device may be removed from a first mount and coupled to a second mount. While the recording device is attached to the second mount, the recording device may perform a particular set of functions that are different from the set of functions performed while mounted to the first mount.

A mount may include an identifier. An identifier may uniquely identify a mount. An identifier may relate to a particular vehicle (e.g., vehicle ID, serial number, vehicle identification number), a vehicle type, and/or a location where the mount is positioned in a vehicle. A mount may provide its identifier to a recording device. A mount may provide its identifier to a recording device responsive to coupling the recording device to the mount.

The recording device, responsive to being coupled to a mount, may request a configuration profile. A server may store (e.g., maintain) one or more configuration files. A server may provide a configuration file to a recording device directly or indirectly. A configuration profile may include one or more configuration settings associated with at least one of a mount ID, vehicle type, vehicle ID, and recording device type. A recording device may receive the configuration settings included in the configuration profile. A recording device may apply the configuration settings. The configuration settings may determine the operations (e.g., behavior) of the recording device.

Vehicle system 100 includes recording devices and mounts in a vehicle. Vehicle system 100 may further include sensors and a mobile data terminal. Vehicle system includes mounts 122, 132, 142, and 152 and recording devices 120, 130, 140, and 150. Recording devices 120, 130, 140, 150 may be removably coupled (e.g. attached) to a respective mount. Operation of a recording device may be in accordance with the mount to which the recording device is attached.

Mounts 122, 132, 142, and 152 are mounted (e.g., fixed, attached) to vehicle 110 at various positions in the vehicle. For example, mounts 122 and 132 are positioned in a front portion of vehicle 110. Mount 142 is positioned in a central (e.g., middle) portion of vehicle 110. Mount 152 is positioned in a rear portion of vehicle 110. The one or more mount positions within vehicle 110, or without vehicle 110, allow one or more recording devices to capture data over an area. For example, while recording device 120 is coupled to mount 122, recording device 120 may be oriented to capture data that occurs forward of vehicle 110. While coupled to mount 132, recording device 130 may be oriented to capture data that occurs inside the cab of vehicle 110 and in particular, the front portion of vehicle 110. Recording device 140, while mounted to mount 142, may be oriented to capture data that occurs in the backseat of vehicle 110. Recording device 150, while coupled to mount 152, may be oriented to capture data that occurs behind vehicle 110.

Vehicle system 100 may include sensors 170 to detect the status of an operation of vehicle 110. Vehicle operations may provide advanced warning of a possible incident that should be recorded. Vehicle operations detected by sensors 170 may include switching on the lights of a cruiser, switching on the siren of a cruiser, rapid acceleration of a cruiser, traveling in a cruiser above a threshold speed, opening of a door of a cruiser, and removal of a shotgun from a vehicular shotgun holder.

Vehicle system 100 may include a mobile data terminal ("MDT") 160. MDT 160 may communicate with sensors 170. MDT 160 may further communicate with mounts 122-152 and recording devices 120-150.

Data recorded by a recording device may be transferred, in real-time or sometime after recording, to a server. Transfer of data from one or more recording devices may be accomplished by direct communication of a recording device with a server via a network or via an intermediary device, such as an MDT or handheld electronic device.

In an implementation, vehicle system 250 may cooperate with electronic device 240 and/or network 230, and server 210 to form configuration system 200. Vehicle system 250 may communicate with server 210 via electronic device 240 and/or via network 230.

In a vehicle system, a server directs (e.g., instructs) an installer while installing mounts in a vehicle. The installer provides information regarding the vehicle and the installation to the server that may be used to determine a configuration profile for a recording device while the recording device is coupled to a mount in the vehicle.

A server of a vehicle system may also receive information from recording devices and mounts. Recording devices may provide information (e.g., recording device ID) to a mount and the mount may communicate the coupling of the recording device to the mount or a recording device may receive information from the mount and the recording device may communicate the coupling. The server may use the information of the pairing of a mount with a recording device along with other information to access (e.g., retrieve) a configuration profile. The configuration profile may be sent to the recording device coupled to a specific mount in a specific vehicle so that the recording device operates in accordance with the mount location and the vehicle type.

A server of a vehicle system may also receive information captured and recorded by a recording device.

For example, server 210 may include engines and data stores which operate to store and process data received from recording devices and/or mounts. Recorded data store 220 may store data (e.g., audiovisual, audio, thermal) captured and recorded by one or more recording devices. Data stored in recorded data store 220 may also include any metadata (e.g., time-stamps, operator of the recording device, date of capture, nearby recording devices) that may be generated and/or received by a recording device.

Server 210 may include engines and data stores which operate to store and process configuration profiles for recording devices.

Profile engine 216 and profile data store 224 cooperate to configure recording devices coupled to a mount. Server 210 may include engines and data stores which operate to store and process installation instructions for mounts. Install instruction engine 212 and install instruction data store 218 cooperate to provide mount installation information to a person installing mounts into a vehicle. Data generated by installed mounts may be processed and stored by mount engine 214 and mount data store 222 respectively.

Server 210 includes communication circuit 226 and processing circuit 228. Communication circuit 226 may communicate with network 230. Communication circuit 226 may communicate with processing circuit 228. Processing circuit 228 may control in whole or in part communication circuit 226. Communication circuit may receive data from one or more data stores. Communication circuit may provide data to one or more data stores for storage.

Vehicle system 250 includes recording devices 260, 270, and 280. Vehicle system 250 includes mounts 262, 272, and 282. Vehicle system 250 may further include MDT 290 and Sensors 292. Recording devices 260, 270, and 280 may communicate with MDT 290. Mounts 262, 272, and 282 may communicate with MDT 290. Recording devices 260, 270, and 280 and mounts 262, 272, and 282 may communicate with electronic device 240 and/or network 230. Recording devices 260, 270, and 280 and mounts 262, 272, and 282 may communicate with server 210 via network 230, electronic device 240, and/or MDT 290.

A recording device (e.g., camera, infrared camera microphone, GPS receiver, electronic compass, electronic gyroscope) detects (e.g., captures) information regarding physical properties in an environment and records (e.g., stores) the information (e.g., data). Information that is captured and recorded is referred to herein as data (e.g., captured data, recorded data). Data may be analyzed to determine characteristics of the physical properties detected and recorded.

Captured data may relate to an incident (e.g., event, occurrence). Captured data may provide a record of an incident or an aspect of an incident. Captured data may be reviewed to provide a reminder of an incident. Captured data may be used as evidence to prove the occurrence of an incident. Captured data may be used as and referred to as evidence.

A recording device may communicate with (e.g., transmit to, receive from) another electronic device via a short-range wireless communication link. A recording device may communicate with a network and via the network with another electronic device. A recording device may communicate with a network using a long-range communication protocol. A recording device may transfer captured and recorded data to another system.

A recording device may include any conventional communication circuitry for transmitting and/or receiving data. A recording device may use any conventional wired (e.g., LAN, Ethernet) or wireless communication (e.g., Bluetooth, Bluetooth Low Energy, WiFi, ZigBee, 2G, 3G, 4G, WiMax) communication protocol. A recording device may store data for a given period (e.g., event, incident) then transmit the data to another system. A recording system may transmit information to another system as it is captured (e.g., live streaming).

A recording device may detect and record visual (e.g., video, related to light) physical properties and/or audible (e.g., audio, related to sound) physical properties. Visual and audible detected properties together may be referred to as audiovisual data, video data or audio data respectively. As used herein, "audiovisual" information, data, or recordings refers to video that includes audio, video that is associated with separate audio of the video scene, or audio alone. Use of the term video data may refer to both video and audio data together.

The capture and storing of video and/or audio data may be accomplished using any suitable technique. A recording device may create a record. Data stored by a recording device may be stored in any suitable format, including but not limited to H.264, MPEG-4, AAC, and WAV. A recording device may convert the captured data from one format (e.g., analog data, encoding) to another format (e.g., digital data, encoding).

A recording device may generate and/or receive data in addition to captured data, such as information regarding the captured data, the recorded data, the recording device, the mount, the vehicle, a user of the recording device, and communications made by the recording device. Such data is referred to herein as metadata. Metadata may include recording device identifiers, the operator of the recording device, an identifier of the incident captured, date of capture, orientation of the recording device, mount attached to the recording device, vehicle in which the recording device is placed, and geographic location of recording device. Metadata may include any convention information that is provided by a conventional recording device.

As discussed above, a recording device may include many types of recording devices. As discussed above, recording device types may include a camera, infrared camera, microphone, GPS receiver, electronic compass, and electronic gyroscope. The operation of a recording device may be determined by a configuration profile. A configuration profile may determine (e.g., set, establish) how a recording device operates or the type of operations performed by a recording device. A recording device may include more than one mode of operation or several different aspects of its operation. A configuration file may include parameters (e.g., data) that establishes how the recording device will operate or the functions it will perform.

For example, a configuration profile may set a camera to record in a high definition mode as opposed to a lower definition mode.

A server may store and provide configuration profiles to one or more recording devices. A configuration profile may be associated with a mount.

A recording device may include a unique identifier (e.g., recording device ID, serial number). The recording device ID may be transmitted to a server and stored by the server. The recording device ID may be used to retrieve a configuration profile for a recording device.

A mount may be installed at a fixed position within a vehicle as shown in FIG. 1. A recording device may be removably coupled to an installed mount. The recording device may couple electrically and/or mechanically to a mount. A mount may communicate with a recording device. A mount may provide information to a recording device. A mount may receive information from a recording device. A mount may communicate with a recording device via the coupler that establishes an electrical and/or mechanical coupling between the mount and the recording device.

A mount may include a power circuit. A power circuit may provide power to the components of the mount. A power circuit of a mount may receive power from a power source of the vehicle (e.g., battery, alternator). A power circuit of a mount may provide power to a recording device. A power circuit of a mount may provide power to a recording device via the coupler that establishes an electrical and/or mechanical coupling between the mount and the recording device.

A mount may include a unique identifier (e.g., mount ID, serial number). The unique identifier of a mount may be communicated to a recording device coupled to the mount. The unique identifier of a recording device may be communicated to the mount to which the recording device is coupled. The unique identifiers of the mount and the recording device that are coupled together may be transmitted to a server.

A vehicle may have a unique identifier (e.g., VIN, department number). Responsive to the successful installation of a mount in a vehicle, a mount may transmit its mount identifiers to a server. Mount identifiers may be associated with the unique vehicle identifier. The position of the mount in the vehicle may be identified and associated with the mount identifier. Mount identifiers and/or mount position information may be transmitted to a server. Mount identifiers may be stored in the mount data store.

Each vehicle type may have one or more mount positions where a mount may be installed. Mount positions may include a back seat, a front cabin view, a front windshield view, a rear view, and trunk view. Mount position may be stored in a mount data store. The mount position may be used to retrieve a configuration profile for a recording device coupled to the mount at that position. Configuration profile settings may be different according to mount position. For example, a recording device installed in a trunk position may require fewer frames per second than a recording device installed in the front windshield position or a recording device installed to detect physical characteristics in a back seat of a vehicle may be configured to illuminate a light on the recording device so that a person in the back seat will know that the device is recording.

In an implementation, recording device 610 performs the functions of a recording device as discussed herein. Recording device 610 include processing circuit 612, communication circuit 614, computer-readable medium 616, sensors 618, power circuit 620, mechanical/electrical coupler 622, and connections 624 and 626.

Processing circuit 612 may control, in whole or in part, communication circuit 614, computer-readable medium 616, sensors 618, and mechanical/electrical coupler 622. Processing circuit 612 and sensors 618 may cooperate to captured data regarding physical characteristics and to store the captured data in computer-readable medium 616. Computer-readable medium 616 (e.g., memory) may further store data related to recording device 610 such as recording device type and recording device ID. Data stored in computer-readable medium 616 may further include any metadata (e.g., time-stamps, operator of the recording device, date of capture, nearby recording devices) that may be generated and/or received by recording device 610. Mechanical/electrical coupler 622 may be electrically coupled to processing circuit 612 via connection 626. Mechanical/electrical coupler 622 may be coupled to power circuit 650 via connection 632.

Mount 640 performs the functions of a mount as discussed herein. Mount 640 includes communication circuit 642, processing circuit 644, computer-readable medium 646, mechanical/electrical coupler 648, power circuit 650, and connections 652 and 654.

Processing circuit 644 may control in whole or in part communication circuit 642, computer-readable medium 646, and mechanical/electrical coupler 648. Computer-readable medium 646 may store mount identifiers such as mount ID and mount position. Data stored in computer-readable medium 646 may further include any data received from by mount 640 such as recording device type, recording device ID, vehicle type, metadata, and/or vehicle ID. Mechanical/electrical coupler 648 may be coupled to processing circuit 644 via connection 654. Mechanical/electrical coupler 648 may be coupled to power circuit 650 via connection 652. Power circuit 650 may receive power from external power source 660.

Recording device 610 removably couples (e.g. attaches) to mount 640 via coupler 622 and 648. The coupling may be mechanical and/or electrical. Recording device 610 may receive power from and communicate with mount 640 via the mechanical/electrical couplers 622 and 648. Mechanical/electrical coupler 648 may transmit power to mechanical/electrical coupler 622 through connection 632. Processing circuit 612 may communicate with processing circuit 644 via couplers 622 and 648 via connection 630.

A computer-readable medium may receive, store, retrieve, provide, and/or organize data. As used herein, the term "computer-readable medium" includes any storage medium that is readable by a machine (e.g., computer, computing device, processor, processing circuit). Storage medium includes any devices, materials, and/or structures used to place, keep, and retrieve data (e.g., information). A storage medium may be volatile or non-volatile. A storage medium may include any semiconductor medium (e.g., RAM, ROM, EPROM, Flash), magnetic medium (e.g., hard disk drive), optical medium technology (e.g., CD, DVD), or combination thereof. Computer-readable medium includes storage medium that is removable or non-removable from a system. Computer-readable medium may store any type of information, organized in any manner, and usable for any purpose such as computer readable instructions, data structures, program modules, or other data. A data store may be implemented using any conventional memory, such as ROM, RAM, Flash, or EPROM. A data store may be implemented using a hard drive.

As discussed above, officers may require different vehicles to execute their various duties. Recording devices may be mounted in a vehicle of a certain type and later transferred to a vehicle of another type. Vehicle types may include prisoner transport, squad transport, patrol cruisers, command transport, and unmarked vehicles as discussed above. The configuration settings for a recording device may change according to the vehicle type in which the recording device operates. For example, an unmarked vehicle may be configured to keep recording device lights and/or display off to maintain a low profile while a recording device in a prisoner transport vehicle may be configured to keep recording device lights on, so that prisoners know that their actions are being recorded.

As discussed above, each vehicle may have a unique vehicle ID. A vehicle ID may be associated with one or more mount IDs of the mounts mounted in the vehicle. A vehicle ID may be associated with various recording devices while a recording device is coupled to a mount in the vehicle. A vehicle ID may be used, at least in part, to retrieve a configuration profile for a recording device coupled to a mount in the particular vehicle.

A network enables electronic devices to communicate (e.g., exchange, send, receive, transmit) data (e.g., information). A network may include nodes. A communication link (e.g., data link) permits the transfer of information between nodes of the network. A communication link may include a wired or wireless link. A node of a network may include a server, a recording device, a mount, an MDT, and/or a hand-held device. A server may provide and/or receive data via other nodes and communication links of the network.

As an example of communication via a network, a device in vehicle 250, such as recording device 260, 270, 280, mount 262, 272, 282, and/or MDT 290 may use communication links 236 and/or 238 to communicate with server 210 via electronic device 240 and communication link 234 and via communication link 232.

An electronic device sends and/or receives data. An electronic device may be a node in a network. An electronic device may be stationary or portable. An electronic device may present information on a display of the electronic device. An electronic device may receive information from a user via a user interface. An electronic device may perform calculations and/or analysis of data. An electronic device may perform a calculation and/or analysis on data and provide (e.g., transmit) the result to another device. An electronic device may communicate with other devices via a wired or wireless connection. An electronic device may include a smart phone carried by an officer. An electronic device may include a tablet device, a portable computer, and/or a mobile data terminal (MDT) in a vehicle. An electronic device may operate as an intermediary between a vehicle and a node of the network, such as a server.

A processing circuit includes any circuitry and/or electronic subsystem for performing a function. A processing circuit may include circuitry that performs (e.g., executes) a stored program. A processing circuit may include a digital signal processor, a microcontroller, a microprocessor, an application specific integrated circuit, a programmable logic device, logic circuitry, state machines, MEMS devices, signal conditioning circuitry, communication circuitry, a radio, analog-to-digital converters, digital-to-analog converters, data busses, address busses, memory, and/or a combination thereof in any quantity suitable for performing a function and/or executing one or more stored programs.

A processing circuit may provide and/or receive electrical signals whether digital and/or analog in form using any conventional protocol. A processing circuit may receive information, manipulate the received information, and provide the manipulated information. A processing circuit may store information and retrieve stored information. A processing circuit may cooperate with a memory to store and/or retrieve information. Information received, stored, and/or manipulated by the processing circuit may be used to perform a function, control a function, and/or to execute a stored program.

A processing circuit may detect the operation of a control (e.g., button, switch, touch screen) of a user interface. A processing circuit may perform a function of the device responsive to operation of a control. A processor may perform a function, halt a function, resume a function, or suspend a function of the device of which the control and the processor are a part. A control may provide analog or binary information to a processor. Operation of a control includes operating an electromechanical device or selecting a portion of touch screen.

A processing circuit may control the operation and/or function of other circuits and/or components of a system. A processing circuit may control the operation of system in accordance with a configuration profile. A processing circuit may receive status information regarding the operation of other components of a system, perform calculations with respect to status information, and provide commands (e.g., instructions) to one or more other components for the component to start operation, continue operation, alter operation, suspend operation, or cease operation. Commands and/or status may be communicated between a processing circuit and other circuits and/or components via any conventional protocol. A recording device, a mount, a handheld device and/or a server may include a respective processing circuit.

In an implementation, processing circuit 228 receives information from network 230 via communication circuit 226. Responsive to data, processing circuit 228 may perform one or more functions. Functions may include storing information in a data store, retrieving information from a data store, performing a function of an engine, transmitting and/or receiving data via communication circuit 226.

A communication circuit enables a system, a server, processing circuit, or a computing device, as discussed below, to communicate with other systems, servers, and/or devices. Communication includes sending and/or receiving data and/or signals. Communication between systems, servers, and/or devices may occur over (e.g., through, via) a network. The functions of a communication circuit may be performed by circuits, a processing circuit, logic embedded in hardware, software instructions executable by a processor, or any combination thereof. The functions performed by a communication circuit enable a system, a server, or a computing device to communicate with anther system, server, or computing device. The functions performed by a communication circuit, whether using hardware or software executed by a processor, may be referred to as services. A device may request the services of a communication circuit to communicate with another device.

A communication circuit may communicate via wireless medium and/or a wired medium. A communication circuit may include circuits, logic embedded in hardware, or software instructions executable by a processor (e.g., wireless communication circuit) for wireless communication. A communication circuit may include circuits, logic embedded in hardware, or software instructions executable by a processing circuit (e.g., wired communication circuit) for wired communication. The circuits, logic embedded in hardware, or software used for a wireless communication circuit may be the same in whole or in part as the circuits, logic embedded in hardware, or software used for a wired communication circuit. A communication circuit may communicate using any conventional wired (e.g., LAN, internet) or wireless communication (e.g., Bluetooth, Bluetooth Low Energy, WiFi, ZigBee, 2G, 3G, LTE, WiMax) protocol.

The term "engine" as used herein refers to, in general, circuitry, logic embodied in hardware and/or software instructions executable by a processor of a computing device. Circuitry includes any circuit and/or electrical/electronic subsystem for performing a function. Logic embedded in hardware includes any circuitry that performs a predetermined operation or predetermined sequence of operations. Examples of logic embedded in hardware include standard logic gates, application specific integrated circuits ("ASICs"), field-programmable gate arrays ("FPGAs"), microcell arrays, programmable logic arrays ("PLAs"), programmable array logic ("PALs"), complex programmable logic devices ("CPLDs"), erasable programmable logic devices ("EPLDs"), and programmable logic controllers ("PLCs"). Logic embodied in (e.g., implemented as) software instructions may be written in any programming language, including but not limited to C, C++, COBOL, JAVA™, PHP, Perl, HTML, CSS, JavaScript, VBScript, ASPX, HDL, and/or Microsoft .NET™ programming languages such as C#. The software for an engine may be compiled into an executable program or written in an interpreted programming language for execution by a suitable interpreter or virtual machine executed by a processing circuit. Engines may be callable (e.g., executable, controllable) from other engines or from themselves.

Generally, the engines described herein can be merged with other engines, other applications, or may be divided into sub-engines. Engines that are implemented as logic embedded in software may be stored in any type of computer-readable medium. An engine may be stored on and executed by one or more general purpose computers, thus creating a special purpose computer configured to perform the functions of (e.g., provide) the engine.

The devices and systems illustrated herein may include one or more computing devices configured to perform the functions of the illustrated engines, though the computing devices themselves have not been illustrated in every case for the sake of clarity.

In an implementation, computing device 300 may include processing circuit 312, computer-readable medium 314, and communication circuit 316. As discussed above, processing circuit 312, computer-readable medium 314, and communication circuit 316 cooperate to perform the functions of an engine.

As understood by one of ordinary skill in the art, a "data store" as described herein may be any suitable device configured to store data for access by a computing device. A data store receives data. A data store retains (e.g., stores)

data. A data store retrieves data. A data store provides data for use by a system, such as an engine. A data store may organize data for storage.

A data store may organize data as a database for storage and/or retrieval. A database may include entries of related data. The operations of organizing data for storage in or retrieval from a database of a data store may be performed by a data store. A data store may include a repository for persistently storing and managing collections of data. A data store may store files that are not organized in a database. Data in a data store may be stored in a system.

An example of a data store which includes reliable storage but also low overhead, is a file system or database management system that stores data in files (or records) on a computer-readable medium such as flash memory, random access memory (RAM), or hard disk drives.

One example of a data store suitable for use in server 210 is a highly reliable, high-speed relational database management system ("RDBMS") executing on one or more computing devices and accessible over a high-speed network. However, any other suitable storage technique and/or device capable of quickly and reliably providing the stored data in response to queries may be used, such as a key-value store and an object database.

Data stores 218-224 perform the functions of a data store discussed herein. For example, the mount ID, mount position, vehicle type, vehicle ID, and configuration profiles may be stored in data stores on a server. Audiovisual data captured by one or more recording devices may be stored in a recorded data store. A mount data store may contain mount ID, mount position, vehicle type, and/or vehicle ID information. A profile data store may contain configuration profiles associated with one or more of mount position, vehicle type, vehicle ID, and/or recording device type. The profile data store may contain default configuration profiles for cases where information such as vehicle type is unknown. A data store may be implemented using any computer-readable medium. An engine may access data stores 218-224 locally (e.g., via data bus), over a network, and/or as a cloud-based service.

One of ordinary skill in the art will recognize that separate data stores described herein may be combined into a single data store, and/or a single data store described herein may be separated into multiple data stores, without departing from the scope of the present disclosure.

An install instruction engine guides an installer during the installation of mounts in a vehicle. During installation, an installer may transmit data to the install instruction engine. Data transmitted may include vehicle information such as vehicle type and/or vehicle ID. Vehicle information may be used by the install instruction engine to retrieve installer instructions for a specific vehicle and/or vehicle type. For example, a patrol cruiser may have a different mount installation procedure than the procedure used to install mounts into a prisoner transport vehicle. Installation instructions may be stored in an install instruction data store. The install instruction engine may retrieve installation instructions from the install instruction data store. The install instruction engine may transmit installation instructions to an electronic device (e.g., smart phone, tablet, mobile computer) used by the installer during the installation. The installer may also provide information to the install instructions engine via the electronic device. The installer may use the electronic device to receive prompts, guidance, and instructions from the install instruction engine.

The install instruction engine may instruct (e.g., prompt, provide) the user with a location to install a mount. Once the installer has installed the mount at the location indicated, the installer transmits to the install instruction engine verification that the installation of that mount is complete. Responsive receiving verification of installation, the install instruction engine prompts the installer to tap (e.g., contact, place proximate to) the installed mount with the electronic device. Responsive to tapping, the mount may transmit mount information to the electronic device via NFC such as a unique mount ID. The electronic device may transmit the data received from the mount to a server. If the vehicle identifier and/or vehicle type was not earlier transmitted to the server, such data may be transmitted with the information received from a mount.

Upon receiving the information from the mount, the install instruction engine stores the mount information in a data store such as mount data store 222 or the install instruction engine provides the data to a mount engine for processing. The install instruction engine or the mount engine may associate the vehicle identifier with the mount identifier, the mount position, and/or the vehicle type information.

The install instruction engine may provide instructions to the installer to install mounts until all of the mounts for the vehicle have been installed. The number of mounts install may be in accordance with the vehicle type. The install instruction engine may prompt the user to confirm when all mounts have been mounted at the specified positions in or around the vehicle. Once all mounts have been installed in accordance with the information provided by the install instruction data store, the mount installation process is complete and server 210 has received the mount ID for all of the mounts installed in the vehicle.

Install instruction engine 212 performs the functions of an install instruction engine discussed above. Install instruction data store 218 and mount data store 222 perform the functions of an install instruction data store and a mount data store discussed above.

A mount engine may receive information regarding mounts and vehicles into which mounts are mounted. Information may include mount identifiers, mount positions in a specific vehicle, vehicle identifiers, and/or vehicle type. A mount engine may store the information it receives in a mount data store. A mount engine may associate the mount information with the vehicle information into which the mounts are mounted. As discussed above, the functions of storing information in a mount data store may be performed in whole or in part by an install instruction engine.

A mount engine may organize information for storage in a mount data store. The organization of data in a mount data store may establish an association between data. A mount engine may retrieve information from a mount data store.

Mount engine 214 may perform the functions of a mount engine as discussed above. Mount data store 222 performs the functions of a mount data store discussed above.

In an implementation, mount data store 222 stores information related to a mount as an entry in a database.

Each entry, 410-430, includes a mount ID (e.g., 412, 422, 432), the position of the mount in the vehicle (e.g., 414, 424, 434), the vehicle type of the vehicle in which the mount is mounted (e.g., 0.416, 426, 436), and the vehicle ID (e.g., 418, 428, 438). Mount engine 214 may access mount data store 222 to retrieve information. Mount engine 214 may use any portion of an entry as an index for accessing the data in mount data store 222.

In an implementation, mount engine 214 searches for a particular mount ID and retrieves all of the information in the entry for that mount ID. In an implementation, each mount ID appears only once.

A profile engine may access configuration profile information (e.g., profile) stored in a profile data store. A profile engine may store profile information in a profile data store. A profile engine may organize and or format a profile for storage in a profile data store. A profile engine may associate a profile with a recording device. Information included in a profile data store may include mount position, vehicle type, vehicle ID, and recording device type. A profile data store further includes one or more profiles. Each profile is associated with other data stored in the profile data store such as mount position, vehicle type, vehicle ID, and/or recording device type.

Each profile includes data for setting the operation of a recording device that is consistent with the position of the mount to which the recording device is coupled, the vehicle type, the vehicle ID, and/or the recording device type. A profile engine may determine the profile required by a recording device, retrieve the profile from the profile data store, and send the profile to the recording device so that the recording device may operate in accordance with the profile.

A recording device may be removably coupled to a mount within a vehicle. The recording device may be coupled to a first mount position at a first location in the vehicle. A profile engine may receive information from the recording device identifying that the recording device is coupled to a specific mount as identified by its mount ID. A mount engine may use the mount ID to access the mount position, vehicle type, and vehicle ID associated with the mount ID for a mount data store. The mount engine may provide the information to the profile engine. The profile engine may use all or some of the information from the mount data store to access the profile data store to retrieve the profile for the recording device coupled to the mount. The profile is transmitted to the recording device so that the recording device may operation in accordance with the profile and as a recording device should operate when coupled to that specific mount.

Later, the same recording device may be move to a second mount in the same vehicle or to a different vehicle altogether. The mount ID of the second mount may be sent to the server and the mount engine in cooperation with the profile engine may access and transmit the configuration profile to the recording device so that the recording device operations as it is required for that mount at that position in that type of vehicle.

For example, a recording device coupled to mount mounted in the front cabin view position may require different configuration settings than a recording device coupled to mount in a rear-view position at the back of the vehicle. Configuration settings may control any operation of a recording device. For example, for a video recorder operations may include whether the video recorder audible beeps to indicate status, the recording resolution, video frames per second, whether video is captured in color or black and white, whether video is captured in the infrared band, the range of the microphone, and low-power modes.

The profile engine may retrieve a configuration profile associated with any combination of mount position, vehicle type, vehicle ID, and recording device type. A configuration profile may be a default profile for a specific mount position. For example, if the only information provided by the recording device to use to retrieve a profile is a back-seat mount position, the profile engine may retrieve a default profile for a back-seat mount position regardless of vehicle type or vehicle ID. If a specific vehicle ID is known and is assigned a specific configuration profile, a profile engine may retrieve a specific profile for the specific vehicle.

Profile engine 216 performs the functions of a profile engine discussed above. Profile data store 224 performs the functions of a profile data store discussed above.

In an implementation, profile data store 224 includes records organized by recording device type 500, 540, and 580. Each record for a recording device type includes profiles associated with mount position, vehicle type, and/or vehicle identifiers. For example, recording device type 500 may include profiles 502-508 which correspond to a vehicle type of a patrol vehicle. Profiles 510-514 correspond to a transport vehicle type. Recording device type 500 may include specific profile 520 which corresponds to a particular vehicle ID. Recording device type 500 may also include default profiles 530-532 which may be retrieved when vehicle identifiers are unknown or missing.

In an implementation, when a recording device is coupled to a mount, the recording device receives the mount ID from the mount and sends the mount ID and its own recording device ID to server 210. Mount engine 214 receives the mount ID and uses the mount ID to access mount data store 222. Mount engine 214 retrieves the record associated with the mount ID. The record associated with the mount ID provides the mount position of that specific mount in the vehicle, the vehicle type of the vehicle in which the mount is mounted and/or the vehicle ID. Mount engine 214 provides the data to profile engine 216 along with the recording device identifier.

Profile engine 216 uses the recording device identifier to determine the type of the recording device. Profile engine 216 uses the recording device type, the mount position, and the vehicle type to access the profile from profile data store 224 that the recording device that is attached to the mount should use to govern its operation. Profile engine 216 retrieves the appropriate profile from profile data store and sends the profile to the recording device via communication circuit 226. For example, if a recording device of recording device type 500 is attached to a mount in a front cabin view of a transport vehicle, profile 514 is transmitted to the recording device.

The recording device receives the profile and sets its operation in accordance with the data in the profile.

As discussed above, a configuration profile includes data for setting the operation of a recording device. A configuration profile may include data that sets the operation of a recording device in accordance with the position of the recording device in a vehicle, the vehicle type, the recording device type, and/or the vehicle ID of the vehicle in which the mount is mounted.

Functions controlled by the data in a configuration profile may include a resolution of recording, a length of a pre-event buffer, an operation of a user interface, audible tones, and a mode of communication. For example, a configuration profile may configure a recording device to communicate only through a NFC protocol.

Recorded data store 220 may store data captured by one or more recording devices. Data stored may be audiovisual (e.g., visible spectrum and/or infrared) information. Data stored may include information as to which recording device captured the data, the recording device type, the operator of the camera, the incident where the recorded data was captured, the date of capture, and any conventional information (e.g., time-stamps) that may be captured and/or generated by a recording device.

A user interface may include one or more controls that permit a user to interact and/or communicate with an electronic device. Via a user interface, a user may control (e.g., influence, select) the operation (e.g., function) of an electronic device. A user interface may provide information to a user. A user may receive visual, haptic, and/or audible information via a user interface. A user may receive visual information via devices that visually display (e.g., present, show) information (e.g., LCDs, LEDs, light sources, graphical and/or textual display, display, monitor, touchscreen). A user interface may include a communication circuit for transmitting information to an electronic device (e.g., smart phone, tablet computer, laptop computer) for presentation to a user.

In an implementation, electronic device 240 may have a user interface. The user interface may allow an installer to provide information to server 210 such as vehicle type, and/or vehicle ID during installation.

As discussed above, recording devices may be removably attached to amount attached to a vehicle. Method 700 is an implementation of a method performed by an electronic device for guiding an installer to install mounts within and/or on a vehicle. Install instruction engine 212 and install instruction data store 218 may cooperate with electronic device 240 or MDT 290 to perform method 700.

Method 700 may include blocks identifier 702, transmit 704, receive 706, prompt 708, confirm 710, tap 712, receive 714, transmit 716, verify 718, end 720.

Execution of identifier 702 prompts an installer to enter (e.g., type, scan bar code) a vehicle type and/or vehicle ID into an electronic device. The electronic device may be a tablet, computer, smartphone, or MDT. Mount installation instructions for a particular vehicle type or vehicle ID may be stored locally on the electronic device or be retrieved from a data store on a server.

If the instructions for guiding the installer through installation are not stored on the electronic device, the electronic device executes 704 and 706 to provide information to a server and to receive mount installation instructions from a server. If the installation instructions are stored locally on the electronic device, steps 704 and 706 may be omitted.

Execution of transmit 704 transmits the vehicle type and/or vehicle ID provided by the installer to a server. The data may be transmitted to the server directly or through a network. Execution moves to receive 706.

The electronic device executes instructions 706 to receive mount installation instructions from a server. The instructions are associated with the previously transmitted vehicle type and/or vehicle ID. If the server does not have instructions for a particular vehicle type and/or vehicle ID, the electronic device may receive default mount installation instructions. Execution moves to prompt 708.

Execution of prompt 708 presents the installer with an instruction to install a mount at a particular position in the vehicle. The first mount position presented by the electronic device may be any of the one or more possible mount positions in a vehicle of that vehicle type. Mount positions may not require a particular order of installation. Responsive to prompt 708, the installer follows installation instructions and physically installs a mount at the prompted position. Execution moves to confirm 710.

Confirm 710 requests confirmation from the installer that mount installation is complete for that mount. The installer may utilize the user interface of the electronic device to confirm the mount installation is finished. Execution moves to tap 712.

Tap 312 instructs the installer to bring the electronic device proximate to the installed mount so that the electronic device and mount may exchange data via near-field communication ("NFC"). Data exchanged may include mount and vehicle identifiers such as mount ID, mount position, vehicle type, and vehicle ID. Execution moves to receive 714.

In receive 714, the electronic device receives mount ID from the mount via NFC. The electronic device may store the mount ID. Data received by the electronic device may also include vehicle type, and vehicle ID. Execution moves to transmit 716.

Transmit 716 transmits vehicle type, vehicle ID, and mount ID from the electronic device to the server. The electronic device may also provide the mount location to the server, but if the server provides the instructions, it may already have the mount position information. The server may store the information in one or more data stores. Execution moves to verify 718.

Verify 718 determines whether mounts are installed at all vehicle positions. The installer may input a confirmation when asked whether all mount positions have mounts installed. If all mounts are not installed, execution returns to prompt 708 and the steps of installation repeats for another mount by prompting a second mount position. If all mounts are installed, execution moves to end 720.

Execution of end 720 terminates the installation method. Electronic device 240 may perform method 700.

Method 800 is an implementation of a method performed by a server for installing fixed mounts with unique identifiers in or on a vehicle. Method 800 may include steps identifier 802, instructions 804, receive 806, store 808, and end 810.

Mount installation instructions may be stored locally on an electronic device or in a data store on a server. If installation instructions are stored on the electronic device, performance of method 800 begins at receive 806. If installation instructions are stored on the server, performance of method 800 begins at identifier 802.

Identifier 802 receives vehicle type and/or vehicle ID information from an electronic device. The server retrieves installation instructions from a data store which are associated with the received vehicle type and/or vehicle ID. If vehicle type or vehicle ID are not found in the server records, the server may retrieve default installation instructions. Execution moves to instructions 804.

Instructions 804 transmits mount installation instructions associated with the vehicle type and/or vehicle ID to an electronic device. Default installation instructions may be transmitted if no matching vehicle type or vehicle ID can be found on the server as discussed above. Execution moves to receive 806.

Receive 806 receives mount and vehicle information from the electronic device. Mount and vehicle information may include vehicle type and/or vehicle ID, mount ID, and mount position. In the event that he server provides the installation instructions to the electronic device, the server may already be in possession of information such as vehicle type, vehicle ID, and/or mount position. Execution moves to store 808.

Store 808 stores data in a mount data store. Data stored may include vehicle type, vehicle ID, mount ID, and mount position. Execution moves to end 810.

Execution of end 810 terminates the installation process. Install instruction engine 212 may perform method 800. Data generated and/or received during execution of method

800 may be stored in mount data store 222. Instructions provided to an installer may be stored in install instruction data store 218.

Method 900 is an implementation of a method performed by a server to retrieve a configuration profile for a recording device. The configuration profile may set (e.g., control, modify) the operation (e.g., behavior) of the recording device for operation in a variety of mount positions and vehicle types. Each configuration profile is associated with one or more of mount ID, mount position, vehicle type, or vehicle ID Method 900 may include steps receive 902, check 904, notice 906, access 908, access 910, search 912, transmit 914, search 916, transmit 918, search 920, transmit 922, notice 924, and end 926.

Receive 902 receives any combination of recording device type, recording device ID, and mount ID from a recording device directly or indirectly. Execution moves to check 904.

Check 904 determines whether the received mount ID is stored in a mount data store. If the mount ID is found in the mount data store, mount information corresponding to the mount ID may be accessed. Execution moves to access 908.

If the mount ID cannot be found in the mount data store, then no configuration profile may be retrieved and execution moves to notice 906.

Notice 906 transmits a notice that the received mount ID is not stored on the server in the mount data store. No configuration profile for the requested mount ID can be transmitted to the recording device. Execution moves to access 910 were a default profile will be retrieve in accordance with recorder device type.

Access 908 accesses the mount data store using the mount ID to retrieve data. Data retrieved may include any combination of vehicle type, vehicle ID, and/or mount position. The data retrieved may be used to determine the appropriate configuration profile for the recording device. The data retrieved from the mount data store may be used to access the profile data store. Execution moves to access 910.

Access 910 accesses the profile data store. Any combination of mount position, recording device type, and/or vehicle ID information may be used to retrieve a profile for a recording device. A default configuration profile may be retrieved if mount or vehicle identifiers are unknown or missing. Execution moves to search 912.

Execution of search 912 searches the profile data store for entries with only mount position or recording device type. If either or both entries are found, execution moves to transmit 914. If such entries are not found, execution moves to search 916.

Transmit 914 transmits a default profile configured for mount position or recording device type. The profile is transmitted to the recording device either directly or indirectly. Execution moves to end 926.

Search 916 searches the profile data store for entries with only mount position, recording device type, and vehicle type information. If such entries are found, execution moves to transmit 918. If such entries are not found, execution moves to search 920.

Transmit 918 transmits a default profile configured for mount position, recording device type, and vehicle type. The profile is transmitted to the recording device either directly or indirectly. Execution moves to end 926.

Search 920 searches the profile data store for entries with mount position, recording device type, and vehicle ID. If entries are found, execution moves to transmit 922. If entries are not found, execution moves to notice 924.

Transmit 922 transmits a configuration profile configured for mount position, recording device type, and vehicle ID. The profile is transmitted to the recording device either directly or indirectly. Execution moves to end 926.

Notice 924 transmits a notice that requested information was not found in the profile data store. Execution moves to end 926.

Execution of end 926 terminates the configuration profile retrieval process.

Install instruction engine 212 may perform method 900. Mount data store 222 may store mount related information. Profile data store may store profiles and provide profiles in accordance with the information discussed above. Recording device 260, 270, 280 may request and/or receive a configuration profile. Mount 262, 272, and 282 may communicate with recording device 260, 270, 280 to provide a mount ID as part of the method for identifying and receiving a configuration profile.

Further disclosure is provided below.

A method performed by an electronic device for guiding installation of one or more mounts within a vehicle, the mounts configured to removable couple to a recording device, the method comprising:

receiving at least one of a vehicle type and a vehicle identifier;

transmitting a first message, the first message including the at least one of the vehicle type and the vehicle identifier;

receiving the installation instructions associated with the at least one of the vehicle type and the vehicle identifier;

presenting instructions to install a mount at a position within the vehicle;

receiving via near-field communication an identifier from the installed mount, the identifier identifies the mount; and transmitting a second message, the second message includes the identifier.

The above method wherein the identifier uniquely identifies the mount.

The above method further comprising repeating displaying and transmitting a second message for each additional mount, each additional position within the vehicle, and each additional identifier associated with an additional mount.

The above method further comprising prompting an installer to position the electronic device proximate to an installed mount to prior to performing the step of receiving the identifier.

The above method wherein transmitting further comprises transmitting a position within the vehicle of the installed mount.

The above method wherein transmitting comprises transmitting the message to a server.

The above method wherein the electronic device is at least one of a smart phone, a tablet, and a mobile data terminal.

The above method further comprising:

removably coupling a recording device to the mount;

transmitting a signal to the recording device, responsive to the signal the recording device emits a tone.

requesting confirmation from an installer as to whether the recording device emitted the tone;

responsive to a positive confirmation, transmitting a third message, the third message indicates a successful coupling between the mount and the recording device; and responsive to a negative confirmation, transmitting a fourth message, the fourth message indicates an unsuccessful coupling between the mount and the recording device.

The above method further comprising:
receiving a list from a server, the list includes one unique identifiers for each mount that is mounted in the vehicle;
receiving a message from each mount mounted in the vehicle, each message includes a respective identifier for the one mount;
comparing the identifiers on the list to the identifiers received from each mount; and
responsive to finding a discrepancy between the list and the identifiers from the mounts, transmitting a third message regarding the discrepancy.

The foregoing description discusses embodiments, which may be changed or modified without departing from the scope of the invention as defined in the claims. Examples listed in parentheses may be used in the alternative or in any practical combination. As used in the specification and claims, the words 'comprising', 'comprises', 'including', 'includes', 'having', and 'has' introduce an open-ended statement of component structures and/or functions. In the specification and claims, the words 'a' and 'an' are used as indefinite articles meaning 'one or more'. When a descriptive phrase includes a series of nouns and/or adjectives, each successive word is intended to modify the entire combination of words preceding it. For example, a black dog house is intended to mean a house for a black dog. While for the sake of clarity of description, several specific embodiments of the invention have been described, the scope of the invention is intended to be measured by the claims as set forth below. In the claims, the term "provided" is used to definitively identify an object that not a claimed element of the invention but an object that performs the function of a workpiece that cooperates with the claimed invention. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing". The invention includes any practical combination of the structures and methods disclosed. While for the sake of clarity of description several specifics embodiments of the invention have been described, the scope of the invention is intended to be measured by the claims as set forth below.

The location indicators "herein", "hereunder", "above", "below", or other word that refer to a location, whether specific or general, in the specification shall be construed to refer to any location in the specification where the location is before or after the location indicator.

What is claimed is:

1. A method performed by a recording device for configuring the recording device, the recording device removably coupling to a mount, the mount configured to be installed at a location, the method comprising:
responsive to being coupled to the mount, requesting an identifier from the mount, the identifier identifies the mount, the identifier stored by the mount;
transmitting a message, the message includes the identifier and a request for a configuration profile;
receiving the configuration profile, the configuration profile including data, the data being associated with the identifier, the data related to the location where the mount is installed; and
setting in accordance with the configuration profile one or more functions of the recording device, wherein the recording device comprises a video recorder and the one or more functions comprise at least one of whether the video recorder audibly beeps to indicate status, a recording resolution of the video recorder, a video frames per second of recording by the video recorder, whether video is captured in color or black and white by the video recorder, whether video is captured in an infrared band by the video recorder, and whether a recording indicator of the video recorder is illuminated.

2. The method of claim 1 wherein the identifier uniquely identifies the mount.

3. The method of claim 1 wherein the location is in a vehicle and the mount is configured to be installed at the location in the vehicle.

4. The method of claim 3 wherein the data related to the location where the mount is installed sets the one or more functions of the recording device consistent with the location where the mount is installed.

5. The method of claim 1 wherein the transmitting comprises further transmitting a recording device identifier that uniquely identifies the recording device.

6. The method of claim 1 wherein the transmitting comprises further transmitting a recording device type.

7. The method of claim 1 wherein the transmitting comprises transmitting the message to at least one of a server, a portable electronic device, and a mobile data terminal.

8. The method of claim 1 wherein the one or more functions comprise at least one of a length of a pre-event buffer, an operation of a user interface, a mode of power, and a mode of communication.

9. The method of claim 1 wherein the data of the configuration profile includes information regarding the location of the mount within a vehicle.

10. The method of claim 1 wherein the data of the configuration profile includes login information for one or more wireless networks.

11. The method of claim 1 wherein responsive to being detached from the mount, the recording device returns one or more settings to a default configuration.

12. The method of claim 1 wherein the configuration profile is received in accordance with stored information regarding the location where the mount is installed.

13. The method of claim 1 wherein the one or more functions comprise the recording resolution of the video recorder and the video frames per second of recording by the video recorder.

14. A system for configuring a recording device, the system comprising:
a server;
the recording device; and
a mount, the mount mounted at a position in a vehicle;
wherein upon removably coupling the recording device to the mount, the recording device:
requests an identifier from the mount, the identifier identifies the mount, the identifier stored in the mount;
transmits a message to the server, the message includes the identifier and a request for a configuration profile;
receives the configuration profile from the server, the configuration profile includes data, the data being associated with the identifier, the data related to stored information regarding the position where the mount is mounted; and
sets in accordance with the data of the configuration profile one or more functions of the recording device, wherein the one or more functions comprise at least one of a resolution of recording, a frames per second of recording, a length of a pre-event buffer, and a mode of power; and wherein the server:
stores the stored information regarding the position where the mount is mounted.

15. The system of claim 14 wherein the identifier uniquely identifies the mount.

16. The system of claim 14 wherein responsive to being detached from the mount, the recording device returns one or more settings to a default configuration.

17. The system of claim 14 wherein the configuration profile is retrieved by the server using the stored information regarding the position where the mount is mounted, the configuration profile different from another configuration profile according to the stored information regarding the position where the mount is mounted.

18. The system of claim 14 wherein the configuration profile is received from the server after the position where the mount is mounted is transmitted to the server.

19. The system of claim 14 wherein the server is further configured to:
use the identifier to retrieve the stored information regarding the position where the mount is mounted;
retrieve the configuration profile using the stored information regarding the position where the mount is mounted; and
transmit the configuration profile to the recording device.

* * * * *